United States Patent
Goldfarb et al.

(10) Patent No.: US 10,778,533 B2
(45) Date of Patent: Sep. 15, 2020

(54) SYSTEMS AND METHODS FOR SIMULATING DATA CENTER NETWORK TOPOLOGIES

(71) Applicant: Facebook, Inc., Menlo Park, CA (US)

(72) Inventors: Gilad Goldfarb, Mountain View, CA (US); Naader Hasani, San Jose, CA (US); Hans-Juergen Schmidtke, Mountain View, CA (US)

(73) Assignee: Facebook, Inc., Menlo Park, CA (US)

(*) Notice: Subject to any disclaimer, the term of this patent is extended or adjusted under 35 U.S.C. 154(b) by 248 days.

(21) Appl. No.: 15/885,772

(22) Filed: Jan. 31, 2018

(65) Prior Publication Data
US 2019/0238420 A1    Aug. 1, 2019

(51) Int. Cl.
| | |
|---|---|
| *H04L 12/24* | (2006.01) |
| *H04L 12/751* | (2013.01) |
| *H04L 12/801* | (2013.01) |
| *H04L 29/08* | (2006.01) |

(52) U.S. Cl.
CPC ............ *H04L 41/145* (2013.01); *H04L 41/12* (2013.01); *H04L 45/02* (2013.01); *H04L 47/10* (2013.01); *H04L 67/10* (2013.01)

(58) Field of Classification Search
CPC ........ H04L 41/145; H04L 45/02; H04L 67/10
See application file for complete search history.

(56) References Cited

U.S. PATENT DOCUMENTS

| | | | | |
|---|---|---|---|---|
| 10,104,182 | B1* | 10/2018 | Lowit | H04L 67/141 |
| 2005/0240386 | A1* | 10/2005 | Carballo | H04L 41/0896 703/14 |
| 2013/0212578 | A1* | 8/2013 | Garg | H04L 43/0882 718/1 |
| 2014/0047252 | A1* | 2/2014 | Ansari | G06F 1/26 713/320 |
| 2014/0301192 | A1* | 10/2014 | Lee | H04L 47/10 370/230 |

(Continued)

OTHER PUBLICATIONS

"Data Center," retrieved from Internet URL: https://en.wikipedia.org/w/index.php?title=Data_center&oldid=815628934; as accessed on Dec. 18, 2017.

(Continued)

*Primary Examiner* — Michael A Keller
*Assistant Examiner* — Jsing Forng Lin
(74) *Attorney, Agent, or Firm* — FisherBroyles, LLP

(57) ABSTRACT

The disclosed computer-implemented method may include (1) defining a topology of a data center network that defines an arrangement of a plurality of networking devices included in the data center network, (2) generating a routing policy for the data center network based on the defined topology, (3) deriving a forwarding information base (FIB) for each networking device based on the defined topology and the generated routing policy for the data center network, (4) compiling a data center traffic profile for the data center network that includes a set of data flows that include an amount of data that a source networking device begins to transfer to a destination networking device via the data center network at a predetermined time, and (5) executing a simulation of the data center network via the data center traffic profile. Various other methods, systems, and computer-readable media are also disclosed.

20 Claims, 12 Drawing Sheets

(56) References Cited

U.S. PATENT DOCUMENTS

| | | | |
|---|---|---|---|
| 2017/0201425 A1* | 7/2017 | Marinelli | H04L 41/12 |
| 2019/0173793 A1* | 6/2019 | Liu | H04L 47/12 |
| 2019/0222502 A1* | 7/2019 | May | H04J 14/0227 |
| | | | 14/227 |

OTHER PUBLICATIONS

"Network Topology," retrieved from Internet URL: https://en.wikipedia.org/w/index.php? title=Network_topology&oldid=813621166; as accessed on Dec. 17, 2017.

"Point of Delivery," retrieved from Internet URL: https://en.wikipedia.org/wiki/Point_of_delivery_(networking); as accessed on Dec. 19, 2017.

"Software-Defined Networking," retrieved from Internet URL: https://en.wikipedia.org/w/index.php?title=Software-defined_networking&oldid=814439693; as accessed on Dec. 17, 2017.

Andreyev, A., "Introducing data center fabric, the next-generation Facebook data center network," Retrieved from Internet URL: https://code.facebook.com/posts/360346274145943/introducing-data-center-fabric-the-next-generation-facebook-data-center-network/, pp. 1-12 (Nov. 14. 2014).

Hopps, C., "Analysis of an Equal-Cost Multi-Path Algorithm," RFC-2992, Network Working Group (Nov. 2000).

Thaler, D. and Hopps, C., "Multipath Issues in Unicast and Multicast Next-Hop Selection," RFC-2991, Network Working Group (Nov. 2000).

\* cited by examiner

Listing
700

702
```
route_policy[0] = [adj[0][0][0], adj[0][0][0]]
route_target[0] = {0: [0,1,2],
 1: [0,1,2],
 2: [0,1,2],
 3: [3,4,5],
 4: [3,4,5],
 5: [3,4,5],
 6: [6,7,8],
 7: [6,7,8],
 8: [6,7,8],
 9: [9,10,11],
 10: [9,10,11],
 11: [9,10,11]
}
```

704
```
route_policy[1] = [adj[0][0][0], adj[0][0][1],
                   adj[0][0][0]]
route_target[1] = {0: [3,4,5],
 1: [3,4,5],
 2: [3,4,5],
 3: [0,1,2],
 4: [0,1,2],
 5: [0,1,2],
 6: [9,10,11],
 7: [9,10,11],
 8: [9,10,11],
 9: [6,7,8],
 10: [6,7,8],
 11: [6,7,8]
}
```

706
```
route_policy[2] = [adj[0][0][0], adj[0][0][1],
                   adj[1][0], adj[0][0][0]]
route_target[2] = {0: [6,7,8],
 1: [6,7,8],
 2: [6,7,8],
 3: [9,10,11],
 4: [9,10,11],
 5: [9,10,11],
 6: [0,1,2],
 7: [0,1,2],
 8: [0,1,2],
 9: [3,4,5],
 10: [3,4,5],
 11: [3,4,5]
}
```

708
```
route_policy[3] = [adj[0][0][0], adj[0][0][1],
                   adj[1][0], adj[0][0][1],
                   adj[0][0][0]]
route_target[3] = {0: [9,10,11],
 1: [9,10,11],
 2: [9,10,11],
 3: [6,7,8],
 4: [6,7,8],
 5: [6,7,8],
 6: [3,4,5],
 7: [3,4,5],
 8: [3,4,5],
 9: [0,1,2],
 10: [0,1,2],
 11: [0,1,2]
}
```

FIG. 7

Listing 800

SYSTEMS AND METHODS FOR SIMULATING DATA CENTER NETWORK TOPOLOGIES

BACKGROUND

Today, many entities create and/or manage complex data centers capable of storing, accessing, and processing hundreds of terabytes of data (e.g., text, image, and video data). These data center networks may be vast and complex, incorporating thousands of switches, routers, network-enabled devices, and so forth. Evaluating a topology (e.g., an arrangement of various links, nodes, and/or devices within a data center network) for such a data center network can be extremely difficult, complicated, and time consuming.

Traditional network simulation systems may aid in evaluation of small-scale networks. However, conventional simulation strategies employed by such systems are unable to effectively simulate the large scale of data center networks. For example, some traditional network simulation systems are capable of modeling and/or simulating relatively small networks at the event level and/or packet level. However, such traditional network simulation systems do not scale to the extent necessary to reasonably simulate data center networks that may include hundreds or thousands of network traffic routing devices and/or end-point devices.

Other conventional network simulation approaches may apply varying levels of abstraction to simulate certain types of networks, such as software-defined networking (SDN) controlled and/or traffic engineered networks. However, such approaches do not translate to internet protocol (IP) based data center networks that are predominantly based on hop-by-hop and equal-cost multi-path (ECMP) routing. IP hop-by-hop routing may be limited within modern data center networks to shortest-path-first (SPF) routing algorithms, even though SPF routing may be the least path-diverse approach.

Furthermore, conventional network simulation platforms are focused on network traffic and capacity simulation rather than modeling and/or evaluating attributes of the underlying network topology. The instant disclosure, therefore, identifies and addresses a need for improved systems and methods for simulating data center network topologies.

SUMMARY

As will be described in greater detail below, the instant disclosure describes various systems and methods for simulating data center network topologies by defining a topology of a data center network in terms of tiers of the data center network and adjacencies of networking devices in the data center network, generating a routing policy for the data center network based on the defined topology, deriving a forwarding information base (FIB) for each networking device included in the data center network based on the defined topology and the generated routing policy, compiling a data center traffic profile for the data center network based on the derived FIBs, and executing a simulation of the data center network via the data center traffic profile.

In one example, a computer-implemented method for simulating data center network topologies may include defining a topology of a data center network that defines an arrangement of a plurality of networking devices included in the data center network. The method may further include generating a routing policy for the data center network based on the defined topology of the data center network that describes how the plurality of networking devices route data within the data center network. The method may also include, for each networking device included in the data center network, deriving an FIB for the networking device based on the defined topology of the data center network and the generated routing policy for the data center network. The method may additionally include compiling a data center traffic profile for the data center network based on the derived FIBs, the data center traffic profile including a set of data flows, each data flow in the set of data flows including an amount of data that a source networking device begins to transfer to a destination networking device via the data center network at a predetermined time. The method may further include executing a simulation of the data center network via the data center traffic profile.

In some embodiments, the routing policy may include a sequence of connection profiles that the networking devices included in the data center network utilize to route data from the source networking device to the destination networking device. In further embodiments, the routing policy may further include a route target that defines a set of target networking devices that are meant to be reachable from the source networking device via the routing policy.

In some examples, defining the topology of the data center network may include (1) identifying a set of networking devices within the data center network that share a common role within the data center network, (2) designating the identified set of networking devices as a tier of the data center network, (3) assigning an identifier to each of the networking devices included in the tier of the data center network, the identifier associated with the tier of the data center network, and (4) generating a connection profile that describes connectivity of networking devices included in the data center network relative to the tier of the data center network.

In at least one embodiment, the generated connection profile may include at least one adjacency matrix that indicates that a first networking device in the data center network is adjacent to a second networking device in the data center network when the first networking device is capable of communicating with the second networking device.

In some examples, deriving the FIB for the networking device may include (1) determining an additional set of networking devices in the data center network to which the networking device is capable of transmitting data, (2) representing connectivity of the networking device to the additional set of networking devices as a matrix, (3) executing a matrix operation using the at least one adjacency matrix and the matrix representing connectivity of the networking device to the additional set of networking devices, (4) identifying, based on executing the matrix operation, a path from the networking device to a target networking device in the data center network, and (5) including the path from the networking device to the target networking device in the FIB for the networking device.

In at least one embodiment, the derived FIB for the networking device may include at least one set of assigned identifiers that defines a data path from the networking device to another networking device in the data center network.

In some examples, executing the simulation of the data center network may include (1) defining a round-trip delay time (RTT) of the data center network, and (2) initiating at least one data flow included in the set of data flows. In at least one example, executing the simulation of the data center network may further include, upon each expiration of the RTT, (1) updating a link utilization of each networking device in the data center network, and (2) executing at least one flow action for each data flow included in the data center traffic profile based on the link utilization of each networking device associated with the data flow.

In some examples, executing the simulation of the data center network may further include, for each flow in the set of data flows, (1) using the derived FIBs to determine a flow trajectory of the data flow from the source networking device to the destination networking device, and (2) recording the determined flow trajectory. In some examples, updating the link utilization of each networking device in the data center network is based on the recorded flow trajectory of each data flow included in the set of data flows.

In some embodiments, updating the link utilization of each networking device in the data center network may include determining, for each networking device, an amount of data transferred via the networking device during the RTT.

In at least one embodiment, the flow action may include at least one of (1) initiating the data flow, (2) increasing a flow rate of the data flow, (3) decreasing the flow rate of the data flow, (4) determining that the data flow is complete, (5) recording a completion time of the data flow, or (6) identifying a time out of the data flow.

In some examples, the method may further include determining a cost metric associated with the defined topology of the data center network based on the simulation of the data center network. In some such examples, the method may further include adjusting the defined topology of the data center network based on the determined cost metric associated with the defined topology of the data center network. In at least one example, the cost metric associated with the defined topology of the data center network may include at least one of (1) a duration of time between an initiation of a data flow included in the data center traffic profile and a completion of the data flow, (2) a duration of time between an initiation of the simulation of the data center network and a completion of the simulation, (3) a most-utilized networking device in the data center network during the simulation, or (4) a distribution of utilization of the networking devices during the simulation.

In addition, a corresponding system for simulating data center network topologies may include several modules, stored in memory, including a defining module that defines a topology of a data center network that defines an arrangement of a plurality of networking devices included in the data center network. In some embodiments, the system may further include a generating module that generates a routing policy for the data center network based on the defined topology of the data center network that describes how the plurality of networking devices route data within the data center network. In some examples, the system may further include a deriving module that, for each networking device included in the data center network, derives an FIB for the networking device based on the defined topology of the data center network and the generated routing policy for the data center network.

In some examples, the system may further include a compiling module that compiles a data center traffic profile for the data center network based on the derived FIBs, the data center traffic profile including a set of data flows, each data flow in the set of data flows including an amount of data that a source networking device begins to transfer to a destination networking device via the data center network at a predetermined time. In at least one example, the system may further include an executing module that executes a simulation of the data center network via the data center traffic profile. In at least one embodiment, the system may further include at least one physical processor that executes the defining module, the generating module, the deriving module, the compiling module, and the executing module.

In some examples, the defining module defines the topology of the data center network by (1) identifying a set of networking devices within the data center network that share a common role within the data center network, (2) designating the identified set of networking devices as a tier of the data center network, (3) assigning an identifier to each of the networking devices included in the tier of the data center network, the identifier associated with the tier of the data center network, and (4) generating a connection profile that describes connectivity of networking devices included in the data center network relative to the tier of the data center network. The generating module may then generate a routing policy for the data center network based on the defined topology, the deriving module may derive an FIB for each networking device based on the defined topology and the generated routing policy for the data center network, the compiling module may compile a data center traffic profile for the data center network based on the derived FIBs, and the executing module may execute a simulation of the data center network via the data center traffic profile.

In at least one example, the connection profile that the defining module may generate as part of defining the topology of the data center network may include at least one adjacency matrix that indicates that a first networking device in the data center network is adjacent to a second networking device in the data center network when the first networking device is capable of communicating with the second networking device. In some examples, the deriving module may further derive the FIB for the networking device by (1) determining an additional set of networking devices in the data center network to which the networking device is capable of transmitting data, (2) representing connectivity of the networking device to the additional set of networking devices as a matrix, (3) executing a matrix operation using the at least one adjacency matrix and the matrix representing connectivity of the networking device to the additional set of networking devices, (4) identifying, based on executing the matrix operation, a path from the networking device to a target networking device in the data center network, and (5) including the path from the networking device to the target networking device in the FIB for the networking device.

In some examples, the executing module may execute the simulation of the data center network by (1) defining an RTT of the data center network, and (2) initiating at least one data flow included in the set of data flows. The executing module may further execute the simulation of the data center network by, upon each expiration of the RTT, (1) updating a link utilization of each networking device in the data center network, and (2) executing at least one flow action for each data flow included in the data center traffic profile based on the link utilization of each networking device associated with the data flow.

In some examples, the system may further include (1) a determining module, stored in memory, that determines a cost metric associated with the defined topology of the data center network based on the simulation of the data center network, and (2) an adjusting module, stored in memory, that adjusts the defined topology of the data center network based on the determined cost metric associated with the defined topology of the data center network. In such examples, the at least one physical processor further executes the determining module and the adjusting module.

In some examples, the above-described method may be encoded as computer-readable instructions on a computer-readable medium. For example, a computer-readable medium may include one or more computer-executable instructions that, when executed by at least one processor of a computing device, may cause the computing device to define a topology of a data center network that defines an arrangement of a plurality of networking devices included in the data center network. The computer-readable medium may further include one or more computer-executable instructions that, when executed by the at least one processor of the computing device, may cause the computing device to generate a routing policy for the data center network based on the defined topology of the data center network that describes how the plurality of networking devices route data within the data center network.

The computer-readable medium may further include one or more computer-executable instructions that, when executed by the at least one processor of the computing device, may cause the computing device to, for each networking device included in the data center network, derive an FIB for the networking device based on the defined topology of the data center network and the generated routing policy for the data center network. The computer-readable medium may further include one or more computer-executable instructions that, when executed by the at least one processor of the computing device, may cause the computing device to compile a data center traffic profile for the data center network based on the derived FIBs, the data center traffic profile including a set of data flows, each data flow in the set of data flows including an amount of data that a source networking device begins to transfer to a destination networking device via the data center network at a predetermined time. The computer-readable medium may further include one or more computer-executable instructions that, when executed by the at least one processor of the computing device, may cause the computing device to execute a simulation of the data center network via the data center traffic profile.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

FIG. 7 illustrates a set of generated routing policies for a data center network that each include at least one route target, the at least one route target defining a set of target networking devices that are meant to be reachable from a source networking device via the generated routing policy.

Figure 1:
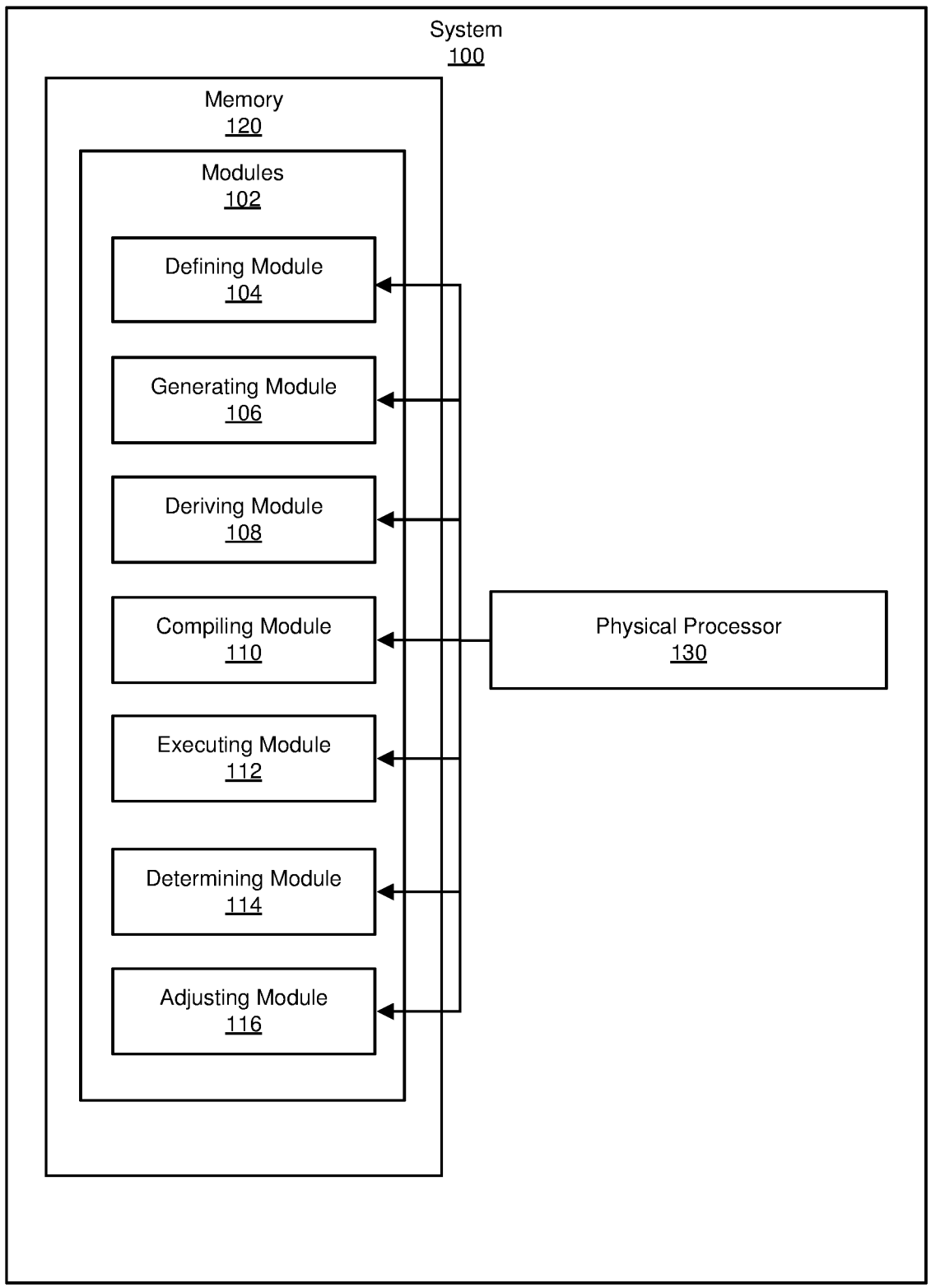
FIG. 1 is a block diagram of an example system for simulating data center network topologies.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for simulating data center network topologies. As will be explained in greater detail below, embodiments of the instant disclosure may define a topology of a data center network that defines an arrangement of networking devices included in the data center network. An embodiment may define the topology in terms of "tiers," which may be groups of networking devices in the data center network that share common roles in the data center network, and "adjacencies," which may describe connectivity of networking devices included in the data center network relative to tiers of the data center network.

Embodiments of the systems and methods described herein may also generate a routing policy for the data center network based on the defined topology that describes how the networking devices included in the data center network route data within the data center network. Some embodiments may also derive, for each networking device included in the data center network, an FIB based on the defined topology of the data center network and the generated routing policy for the data center network. Based on these derived FIBs, an embodiment may compile a data center traffic profile for the data center network. The data center traffic profile may include a set of data flows that each include an amount of data that a source networking device begins to transfer to a destination networking device via the data center network at a predetermined time.

A further embodiment of the present disclosure may execute a simulation of the data center network via the data center traffic profile. During the simulation, an embodiment may use the derived FIBs to determine trajectories for the data flows included in the compiled data center traffic profile, and may initiate the data flows at their designated start times. An embodiment may monitor utilization of networking devices (e.g., links) in the data center network as the data flows simulate transferring data among devices in the data center network. An embodiment may also adjust flow rates of the data flows based on congestion at particular links and then record completion times of the data flows. A further embodiment may utilize the recorded completion times, among other determined cost metrics, to adjust the defined topology of the data center network.

The systems and methods described herein may provide a useful platform for efficiently simulating large-scale data center network topologies. Simulating data center network topologies in accordance with the systems and methods described herein may enable users to quickly determine useful cost metrics for a data center network topology, which may aid users in evaluating, updating, and optimizing the data center network topology. Some additional embodiments of the instant disclosure may also automatically adjust and iteratively optimize a data center network topology based on cost metrics gathered during simulations of the data center network topology.

The following will provide, with reference to FIGS. 1-2 and 4-12, detailed descriptions of systems for simulating data center network topologies. Detailed descriptions of corresponding computer-implemented methods will also be provided in connection with FIG. 3.

FIG. 1 is a block diagram of an example system 100 for simulating data center network topologies. As illustrated in this figure, example system 100 may include one or more modules 102 for performing one or more tasks. As will be explained in greater detail below, modules 102 may include a defining module 104 that defines a topology of a data center network that defines an arrangement of a plurality of networking devices included in the data center network. Example system 100 may further include a generating module 106 that generates a routing policy for the data center network based on the defined topology of the data center network that describes how the plurality of networking devices route data within the data center network. Example system 100 may further include a deriving module 108 that, for each networking device included in the data center network, derives an FIB for the networking device based on the defined topology of the data center network and the generated routing policy for the data center network.

Example system 100 may further include a compiling module 110 that compiles a data center traffic profile for the data center network based on the derived FIBs. In some embodiments, the data center traffic profile may include a set of data flows, each data flow in the set of data flows including an amount of data that a source networking device begins to transfer to a destination networking device via the data center network at a predetermined time. Example system 100 may further include an executing module 112 that executes a simulation of the data center network via the data center traffic profile.

In some embodiments, as further shown in FIG. 1, example system 100 may further include a determining module 114 that determines a cost metric associated with the defined topology of the data center network based on the simulation of the data center network, and an adjusting module 116 that adjusts the defined topology of the data center network based on the determined cost metric associated with the defined topology of the data center network.

As further illustrated in FIG. 1, example system 100 may also include one or more memory devices, such as memory 120. Memory 120 generally represents any type or form of volatile or non-volatile storage device or medium capable of storing data and/or computer-readable instructions. In one example, memory 120 may store, load, and/or maintain one or more of modules 102. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

As further illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 120. Additionally or alternatively, physical processor 130 may execute one or more of modules 102 to facilitate simulating data center network topologies. Examples of physical processor 130 include, without limitation, microprocessors, microcontrollers, central processing units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Figure 2:
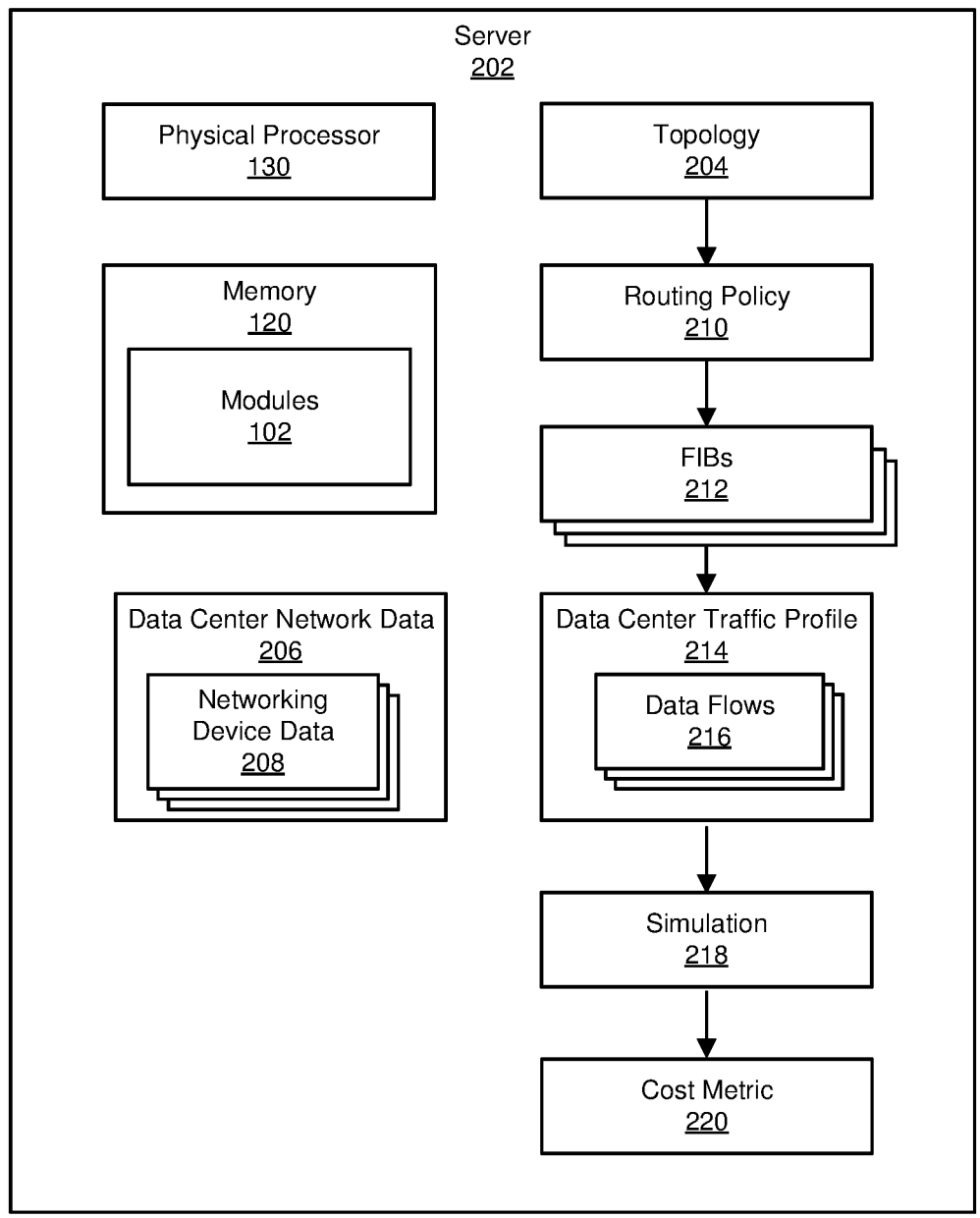
FIG. 2 is a block diagram of an example implementation of a system for simulating data center network topologies.

Example system 100 in FIG. 1 may be implemented in a variety of ways. For example, all or a portion of example system 100 may represent portions of an example system 200 ("system 200") in FIG. 2. As shown in FIG. 2, system 200 may include a server 202. In at least one example, server 202 may be programmed with one or more of modules 102.

In at least one embodiment, one or more modules 102 from FIG. 1 may, when executed by server 202, enable server 202 to perform one or more operations to simulate data center network topologies. For example, as will be described in greater detail below, defining module 104 may define a topology 204 of a data center network (e.g., a data center network represented by data center network data 206) that defines an arrangement of a plurality of networking devices (e.g., a plurality of networking devices represented by networking device data 208) included in the data center network. Additionally, generating module 106 may generate a routing policy (e.g., routing policy 210) for the data center network based on the defined topology of the data center network that describes how the plurality of networking devices route data within the data center network. In some examples, deriving module 108 may, for each networking device included in the data center network, derive an FIB for the networking device based on the defined topology of the data center network and the generated routing policy for the data center network.

Additionally, compiling module 110 may compile a data center traffic profile (e.g., data center traffic profile 214) for the data center network based on the derived FIBs. The data center traffic profile may include a set of data flows (e.g., data flows 216), each data flow in the set of data flows including an amount of data that a source networking device begins to transfer to a destination networking device via the data center network at a predetermined time. Executing module 112 may also execute a simulation (e.g., simulation 218) of the data center network via the data center traffic profile.

In some embodiments, determining module 114 may determine a cost metric (e.g., cost metric 220) associated with the defined topology of the data center network based on the simulation of the data center network. In some examples, adjusting module 116 may adjust the defined topology of the data center network (e.g., topology 204) based on the determined cost metric (e.g., cost metric 220) associated with the defined topology of the data center network.

Server 202 generally represents any type or form of computing device capable of reading and/or executing computer-executable instructions and/or hosting executables. Examples of server 202 include, without limitation, application servers, storage servers, database servers, web servers, and/or any other suitable computing device configured to run certain software applications and/or provide various application, storage, and/or database services.

Many other devices or subsystems may be connected to system 100 in FIG. 1 and/or system 200 in FIG. 2. Conversely, all of the components and devices illustrated in FIGS. 1 and 2 need not be present to practice the embodiments described and/or illustrated herein. The devices and subsystems referenced above may also be interconnected in different ways from those shown in FIG. 2. Systems 100 and 200 may also employ any number of software, firmware, and/or hardware configurations. For example, one or more of the example embodiments disclosed herein may be encoded as a computer program (also referred to as computer software, software applications, computer-readable instructions, and/or computer control logic) on a computer-readable medium.

Figure 3:
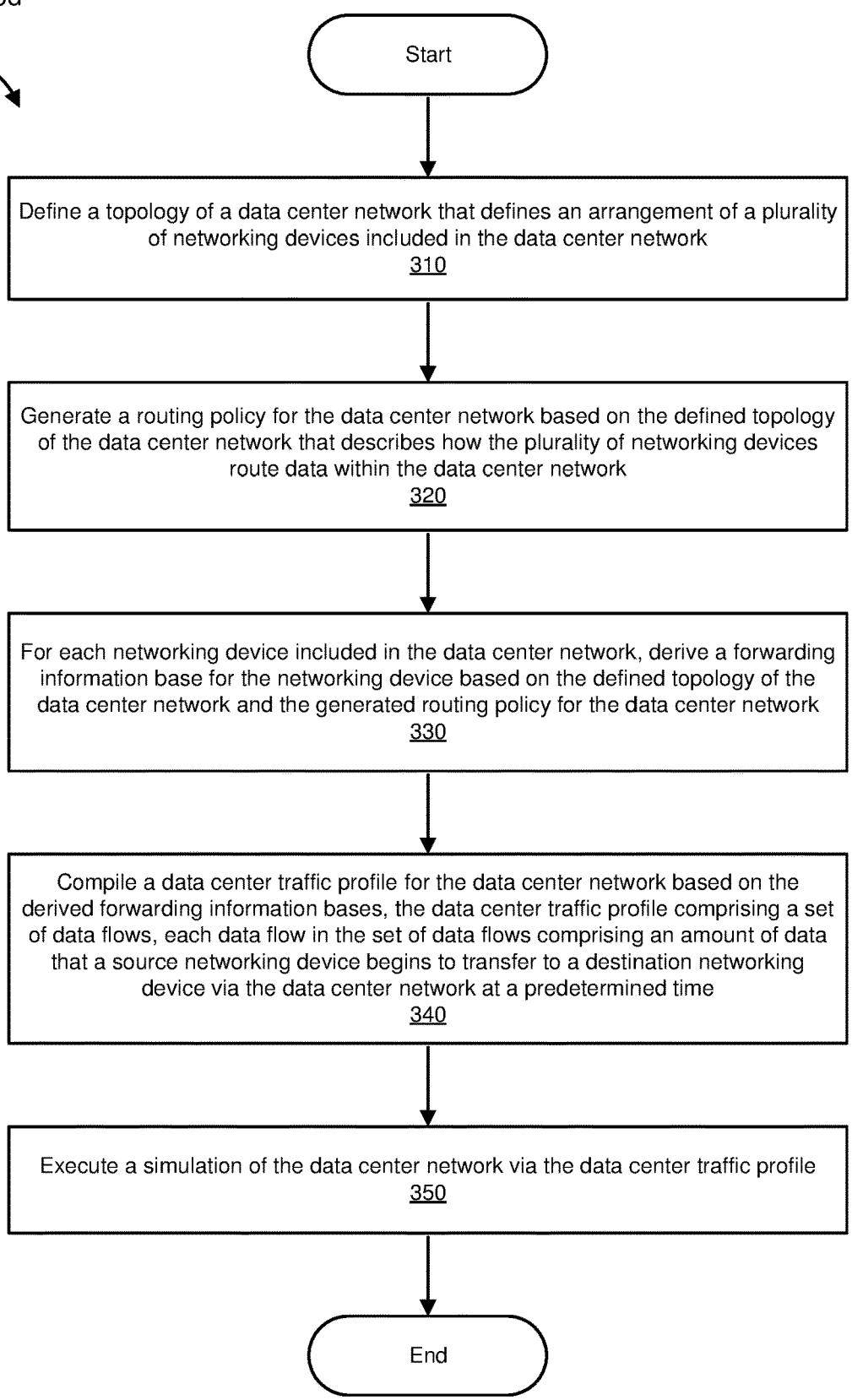
FIG. 3 is a flow diagram of an example method for simulating data center network topologies.

FIG. 3 is a flow diagram of an example computer-implemented method 300 for simulating data center network topologies. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 310, one or more of the systems described herein may define a topology of a data center network that defines an arrangement of a plurality of networking devices included in the data center network. For example, defining module 104 may, as part of server 202 in FIG. 2, cause server 202 to define topology 204 of a data center network (e.g., a data center network represented by data center network data 206) that defines an arrangement of a plurality of networking devices (e.g., a plurality of networking devices represented by networking device data 208) included in the data center network.

In some examples, a "data center network" may refer to a computer network designed for and/or implemented within a suitable data center. In some examples, a data center network may be a computer network that exceeds a predetermined scale threshold, such as a computer network having greater than a predetermined number of routers, switches, end-point devices, other networking devices, and/or transmission media. In some examples, a data center network may be an actual, physical data center network. In other examples, a data center network may be a virtual representation of a data center network (e.g., as represented by data center network data 206).

In some examples, a "topology" or a "topology of a data center network" may refer to an arrangement of various networking devices and transmission media within a data center network. In some examples, a topology of a data center network may include a physical layout of cabling, nodes (e.g., networking devices in the data center network), and links between the nodes and the cabling. This may be referred to as a "physical topology" of the data center network. In other examples, a topology of a data center network may refer to the way that data passes between networking devices included in the data center network. This may be referred to as a "logical topology" of the data center network.

Defining module 104 may define topology 204 in a variety of ways. For example, defining module 104 may identify a set of networking devices within the data center network that share a common role within the data center network and designate the identified set of networking devices as a tier of the data center network.

In some examples, a "tier" may be a group of networking devices within a data center network that have a similar role in the data center network. By way of illustration, a tier in a data center network may include all top-of-rack switches in the data center network. Even though each top-of-rack switch may connect to different endpoints, sit on a different rack in a physical data center, and communicate with a different set of networking devices in the data center network, the top-of-rack switches may generally perform similar activities, and therefore may share a common role within the data center network. Therefore, as an example, defining module 104 may identify a set of networking devices that include all top-of-rack switches in the data center network, and may designate the set of networking devices as a tier of the data center network.

Defining module 104 may further define topology 204 by assigning an identifier to each of the networking devices included in a designated tier of a data center network. For example, defining module 104 may assign a designated tier of a data center network an identifier of 0. The networking devices included in the designated tier of the data center network may thus be referred to as belonging to tier 0. Furthermore, defining module 104 may also assign an identifier to each networking device included in the designated tier that indicates that the networking device is included in the designated tier, and is identifiable and/or distinguishable from another device included in the designated tier. For example, a designated tier of a data center network may include six networking devices. Defining module 104 may assign the designated tier an identifier of 0, and each networking device a unique number from 0 to 5. The first networking device may therefore be referred to as networking device (0,0), the second networking device may be referred to as networking device (0,1), and so forth.

Defining module 104 may further define topology 204 by generating a connection profile that describes connectivity of networking devices included in the data center network relative to the tier of the data center network. Defining module 104 may, for example, model the data center network as a graph, with networking devices included in the data center network modeled as nodes of the graph and connectivity between the networking devices modeled as edges of the graph. When two networking devices are capable of communicating with each other, their representative nodes may be connected by an edge of the graph. In such an example, a connection profile may describe ways that nodes included in the graph may be adjacent to (i.e., may communicate with) other nodes in the graph. In some examples where nodes of a graph may belong to different tiers, a connection profile may describe ways that nodes in one tier may be adjacent to (i.e., may communicate with) nodes in another tier.

Figures 4A, 4B:
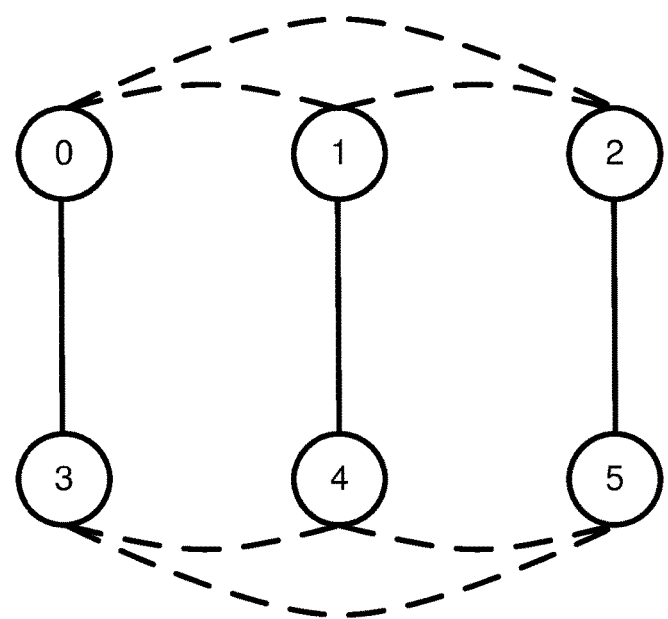
FIGS. 4A and 4B illustrate defining a topology of a data center network that defines an arrangement of a plurality of networking devices included in the data center network based on designated tiers of networking devices in the data center network and adjacency of networking devices in the data center network relative to the designated tiers.

By way of illustration, FIG. 4A shows an example network 400 with six nodes labeled 0 to 5. In this illustration, all six nodes may belong to the same tier. However, the styles of the lines (e.g., solid, dashed, dotted, etc.) may indicate ways of routing traffic in and out of each node. For example, nodes 0 and 3, nodes 1 and 4, and nodes 2 and 5 are joined by solid lines, which may indicate that those nodes can communicate with each other using a first routing method. Conversely, nodes 0, 1, and 2, as well as nodes 3, 4, and 5, are joined by dashed lines, which may indicate that those nodes may communicate with each other using a second routing method.

The generated connection profile may therefore include at least one adjacency matrix that indicates that a first networking device in the data center network is adjacent to a second networking device in the data center network when the first networking device is capable of communicating with the second networking device. An example set of adjacency matrices for network 400 shown in FIG. 4A are shown in FIG. 4B. Adjacency matrix 402 may show adjacencies for nodes in network 400 that are joined by dashed lines (e.g., nodes 0, 1, and 2; nodes 3, 4 and 5), whereas adjacency matrix 404 may show adjacencies for the nodes in network 400 that are joined by solid lines (e.g., nodes 0 and 3; nodes 1 and 4; nodes 2 and 5). As shown, the adjacency matrices included in FIG. 4B may indicate that nodes are adjacent by including a 1 in a corresponding location in the adjacency matrix, and a 0 if the respective nodes are not adjacent. In other examples, connectivity between nodes may be indicated within a connection profile by a number that indicates not only that two nodes may be connected, but may indicate additional information regarding the connection between the two nodes as well. For example, if two nodes are adjacent via a connection capable of a first transmission speed, a connection profile may indicate that adjacency with a 1, whereas if two nodes are adjacent via another connection capable of twice the first transmission speed, the connection profile may indicate that adjacency with a 2. Likewise, as will be described in greater detail below, if two nodes are adjacent, and the connection between them may be preferred over other connections, their adjacency may be indicated within the adjacency matrix by a suitable weighting factor.

Returning to FIG. 3, at step 320, one or more of the systems described herein may generate a routing policy for the data center network based on the defined topology of the data center network that describes how the plurality of networking devices route data within the data center network. For example, generating module 106 may generate routing policy 210 for a data center network (e.g., a data center network represented by data center network data 206) based on topology 204.

In some examples, a "routing policy" may be any data that describes how networking devices included in a network may route data within the network (e.g., a data center network). In at least one example, a routing policy may include a sequence of connection profiles that the networking devices within the network may utilize to route data from a source networking device to a destination networking device. Thus, in some examples, routing policy 210 may be a sequence of adjacencies that the network follows when routing traffic from a source node to a destination node.

Figure 5:
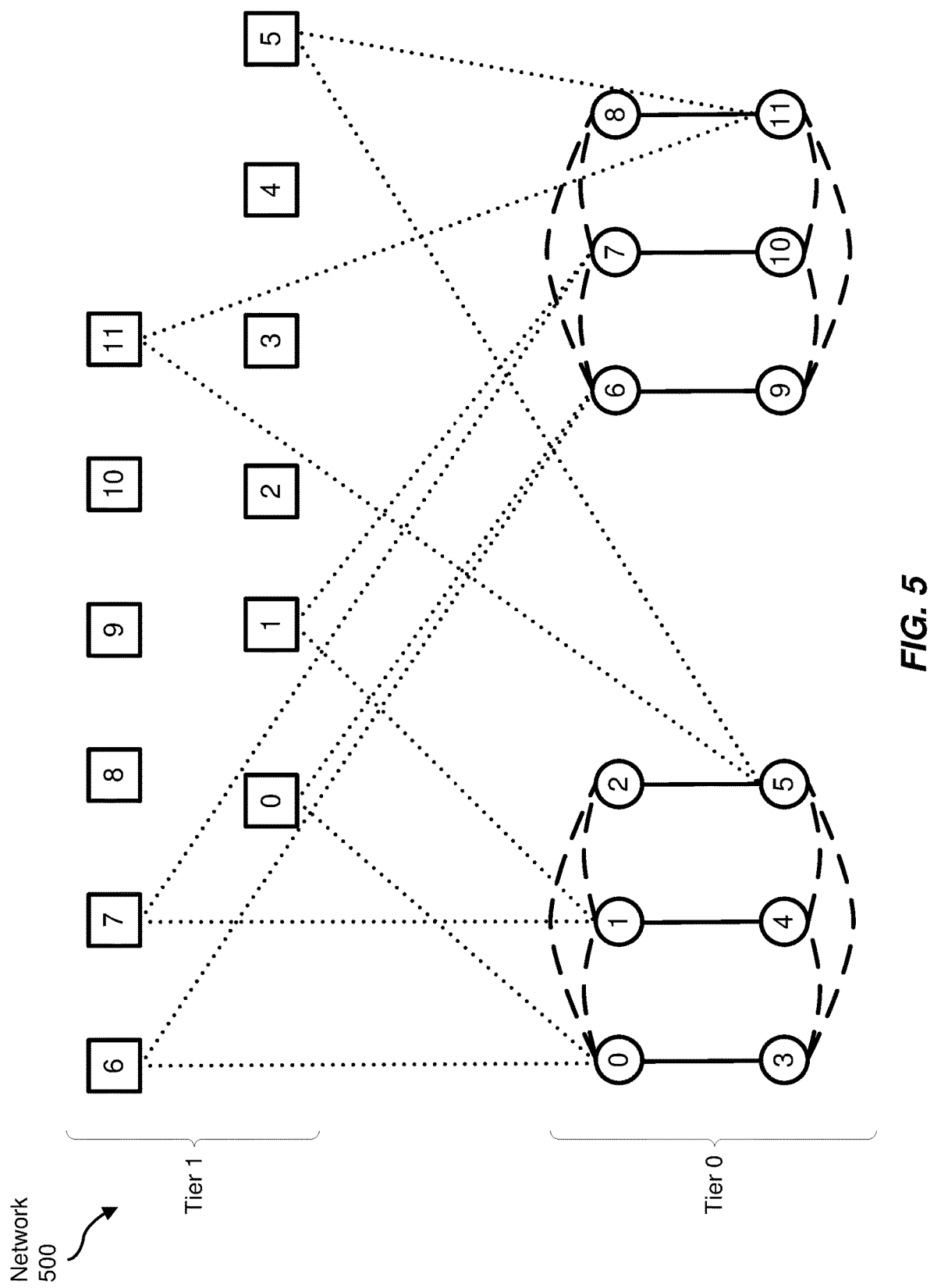
FIG. 5 shows a diagram of a defined topology of a data center network.
Figure 6:
FIG. 6 illustrates a routing policy for a data center network based on a defined topology of a data center network.

By way of illustration, FIGS. 5 and 6 illustrate an example network topology. FIG. 5 shows an example network 500 ("network 500") that includes two groups of 12 nodes each. As described above, defining module 104 may identify and designate a set of nodes in network 500 as tier 0 and assign identifiers to each node in tier 0 such that each node is identifiable by a tier and an identifier. For example, an identifier of (0, 5) may identify the sixth node in tier 0. Likewise, defining module 104 may identify and designate another set of nodes in network 500 as tier 1 and assign identifiers to each node in tier 1 such that, as shown, each node is identifiable by a tier and an identifier. For example, (1, 3) may identify the fourth node in tier 1.

FIG. 5 also shows various types of connections between nodes in network 500. The styles of the lines (e.g., solid, dashed, dotted, etc.) may indicate ways of routing traffic in and out of each node. For example, in tier 0, nodes 0 and 3, nodes 1 and 4, nodes 2 and 5, nodes 6 and 9, nodes 7 and 10, and nodes 8 and 11 are joined by solid lines, which may indicate that those nodes may communicate with each other using a first routing method. Also in tier 0, nodes 0, 1, and 2, nodes 3, 4, and 5, nodes 6, 7, and 8, and nodes 9, 10, and 11 are joined by dashed lines, which may indicate that those nodes may communicate with each other using a second routing method. Some nodes in tier 0 and some nodes in tier 1 are joined by dotted lines, which may indicate that those nodes may communicate with each other using a third routing method. For the sake of clarity, not all connections between nodes in tier 0 and nodes in tier 1 are illustrated in FIG. 5.

In this example, nodes 0 through 2, nodes 3 through 5, nodes 6 through 8, and nodes 9 through 11 of tier 0 may represent network devices connected to each other via a full mesh, in that each node in each group may be connected to all other nodes within that group. These mesh connections may be denoted by dashed lines in FIG. 5. Furthermore, nodes 0 through 2 and nodes 3 through 5 may be part of a first networking cluster or pod, and may be able to communicate via connections between nodes 0 and 3, nodes 1 and 4, and nodes 2 and 5. Likewise, nodes 6 through 8 and nodes 9 through 11 may be part of another networking cluster or pod, and may be able to communicate via connections between nodes 6 and 9, nodes 7 and 10, and nodes 8 and 11. These "cross-mesh" connections may be denoted by solid lines in FIG. 5.

Additionally, nodes in the first network cluster or pod (e.g., nodes 0 through 5 of tier 0) may be able to communicate with nodes in the second cluster or pod (e.g., nodes 6 through 11) via nodes in tier 1. Nodes in tier 1 may be spine switches or other networking devices that connect nodes in the first network cluster or pod to nodes in the second network cluster or pod. These spine switch connections may be denoted by dotted lines in FIG. 5.

As further illustrated in FIG. 6, defining module 104 may generate a connection profile that describes connectivity of networking devices included in the data center network relative to a tier of the data center network. FIG. 6 includes a connection profile 600 for network 500 that includes four adjacency matrices. For simplicity, only indicators of connection (e.g., "1") are shown in the adjacency matrices included in connection profile 600. Together with the designation of tiers of networking devices shown in FIG. 5, adjacency matrices 602 through 608 may define a topology of network 500.

Adjacency matrix 602, labeled adj[0][0][0], describes connectivity between nodes in tier 0 via a first routing method, as denoted by dashed lines in FIG. 5. For example, adjacency matrix 602 indicates that node 0 is connected to node 0 (e.g., itself), node 1, and node 2, that node 1 is connected to node 0, node 1 (e.g., itself), and node 2, and so forth. Adjacency matrix 604, labeled adj[0][0][1], describes connectivity between nodes in tier 0 via a second routing method, as denoted by solid lines in FIG. 5. For example, adjacency matrix 604 indicates that node 0 is connected to node 3, node 1 is connected to node 4, node 2 is connected to node 5, and so forth. Adjacency matrix 606, labeled adj[0][1], describes connectivity between nodes in tier 0 and nodes in tier 1, as denoted by dotted lines in FIG. 5. For example, node 0 in tier 0 is connected to node 0 in tier 1, node 0 in tier 0 is connected to node 6 in tier 1, and so forth. Adjacency matrix 608, labeled adj[1][0] indicates connectivity between nodes in tier 1 and nodes in tier 0. For example, node 0 in tier 1 is connected to node 0 in tier 0, node 0 in tier 1 is connected to node 6 in tier 1, and so forth. While adjacency matrix 606 may appear similar to adjacency matrix 608, they each denote different a different directionality in their respective connections (i.e., adjacency matrix 606 shows connectivity from tier 0 to tier 1, and adjacency matrix 608 shows connectivity from tier 1 to tier 0).

Given the defined topology of network 500 shown in FIGS. 5 and 6, generating module 106 may generate a routing policy for network 500 based on the defined topology that describes how the networking devices included in network 500 may route data within network 500. Generating module 106 may generate a routing policy in any suitable way. For example, as noted above, in at least some embodiments, a routing policy may be a sequence of adjacencies that a network follows when routing traffic from a source node to a destination node. Therefore, generating module 106 may generate a routing policy for a data center network (e.g., network 500) by arranging and/or ordering the adjacencies included in a generated connection profile for a data center network such that, by following the arranged adjacencies, the data center network may route data from at least one source node in the data center network to at least one destination node in the data center network.

In at least some examples, a routing policy may include a route target that may define a set of target networking devices that are meant to be reachable from a source networking device via the routing policy. This may serve to limit the nodes that are reachable from the source node via the routing policy.

By way of illustration, FIG. 7 shows a code listing 700 ("listing 700") that includes four different routing policies that generating module 106 may generate based on the defined topology of network 500. As shown, each routing policy also includes a route target that defines, for each source node in tier 0 of network 500, a set of nodes within tier 0 that are meant to be reachable from the source node via the routing policy.

Routing policy 702 shows "route_policy[0]=[adj[0][0][0], adj[0][0][0]]" which may indicate a routing policy that directs network 500 to, when routing data within a cluster of three meshed nodes (e.g., nodes 0, 1, and 2, nodes 3, 4, and 5, nodes 6, 7, and 8, and nodes 9, 10, and 11), first spray the traffic out to the other nodes in the cluster or pod (e.g., send the traffic to all the nodes in the cluster or pod), and then, if the traffic routes to an intermediary node instead of the destination node, route the traffic from the intermediary node to the destination node via an SPF routing algorithm. Routing policy 702 further includes "route_target[0]" which indicates, for each node in tier 0, a set of nodes in tier 0 that may be reachable from the node via routing policy 702. For example, route_target[0] indicates that traffic originating at node 0 may be routed via route_policy[0] to nodes 0, 1, or 2.

Routing policy 704 shows "route_policy[1]=[adj[0][0][0], adj[0][0][1], adj[0][0][0]]" which may indicate a routing policy that directs network 500 to, when routing data from a node within a mesh (e.g., nodes 0, 1, and 2) to another node in the cross-mesh in the same pod or cluster (e.g., nodes 3, 4, and 5), first spray traffic on the local mesh, then go to the cross-mesh, then route to the destination node via an SPF routing algorithm. Routing policy 704 further includes "route_target[1]" which indicates, for each node in tier 0, a set of nodes in tier 0 that may be reachable from the node via routing policy 704. For example, route_target[1] indicates that traffic originating at node 0 may be routed via route_policy[1] to nodes 3, 4, or 5.

Routing policy 706 shows "route_policy[2]=[adj[0][0][0], adj[0][1], adj[1][0], adj[0][0][0]]" which may indicate a routing policy that directs network 500 to route data from a node in one cluster or pod (e.g., nodes 0 through 5) to a node in a different cluster or pod (e.g., nodes 6 through 11) via a directly connected spine switch. Routing policy 706 further includes "route_target[2]" which indicates, for each node in tier 0, a set of nodes in tier 0 that may be reachable from the node via routing policy 706. For example, route_target[2] indicates that traffic originating at node 0 may be routed via route_policy[2] to nodes 6, 7, or 8.

Routing policy 708 shows "route_policy[3]=[adj[0][0][0], adj[0][1], adj[1][0], adj[0][0][1], adj[0][0][0]]" which may indicate a routing policy that directs network 500 to route data from a source node in a first cluster or pod across a spine switch to a node in a different cluster or pod directly connected via the spine switch. Routing policy 708 further includes "route_target[3]" which indicates, for each node in tier 0, a set of nodes in tier 0 that may be reachable from the node via routing policy 708. For example, route_target[3] indicates that traffic originating at node 0 may be routed via route_policy[3] to nodes 9, 10, or 11.

Returning to FIG. 3, at step 330, one or more of the systems described herein may, for each networking device included in the data center network, derive an FIB for the networking device based on the defined topology of the data center network and the generated routing policy for the data center network. For example, deriving module 108 may, for each networking device included in the data center network represented by data center network data 206, derive an FIB for the networking device based on topology 204. In some examples, a derived FIB (e.g., an FIB in FIBs 212 that corresponds to the networking device) may include at least one set of assigned identifiers (e.g., identifiers assigned to networking devices that are associated with tiers of the data center network, such as (0,0) denoting the first networking device in tier 0) that defines a data path from the networking device to another networking device in the data center network.

In some examples, a "forwarding information base" may be any data that describes and/or includes at least one path (e.g., a data path or data pathway) from a source networking device (e.g., a source node) in a data center network to a target networking device (e.g., a target node) in the data center network. In some examples, an FIB may be represented as an associative array data structure (e.g., a dictionary, a map, etc.) that includes a set of key-value pairs, where the key may represent a "next hop" in a data pathway, and the value may be a further set of key-value pairs that may represent future "hops" in the data pathway.

Figure 8:
FIG. 8 is a code listing that illustrates a variety of FIBs that may be derived based on a defined topology of a data center network and a generated routing policy.
Figure 8:

By way of illustration, FIG. 8 includes listing 800, which includes an FIB 802 and an FIB 804. FIB 802 describes potential data pathways between node 0 and node 10 in tier 0 of network 500 in accordance with routing policy 708 and an equal-cost multi-path (ECMP) load balancing function. As shown, FIB 802 (i.e., fib[0][10]) includes a dictionary with key values that are tuples in a form of (tier, index). The key values (e.g., (0,0), (0,1) and (0,2)) represent potential "next hops" for data from node 0 of tier 0 as the data is routed through network 500 to node 10 of tier 0. For example, at the next hop, data may be routed from (0,0) to one of (0,0), (0,1), or (0,2). If a load balancing function selects (0,2), at the next hop data may be routed from (0,2) to one of (1,2) or (1,8). If the load balancing function then selects (1,2), data may be routed successively to (0,8), (0,11), and finally to destination (0,10). Additionally, if the load balancing function selects (1,8) instead of (1,2), data may be routed successively to (0,8), (0,11), and (0,10).

In some examples, a weighting factor may be associated with the tier and index of a next hop in a group of potential next hops. For example, suppose an agent (e.g., a user, an administrator, an optimization algorithm, etc.) desires to prioritize a selection of a particular next hop in a group of next hops over a selection of other next hops in the group of next hops. A weighting factor may be applied to each next hop in the group of next hops, and a weighted load balancing function may select a next hop based, at least in part, on the applied weighting factors. As described above, in some embodiments, the weighting factors may be inherited from the route policy.

FIB 804 shows FIB 802 (i.e., fib[0][10]) with next hops that include weight factors of 1.0, 0.5, and 0.5, respectively. In this example, it may be twice as likely that a weighted load balancing function may select (0,0) as a next hop than (0,1) or (0,2).

Deriving module 108 may derive an FIB for each networking device included in a data center network based on topology 204 in a variety of contexts. For example, deriving module 108 may select a source node and a target node from a route target of a routing policy. Deriving module 108 may then determine which nodes the source node is adjacent to based on the routing policy, and include them as next-hops in the FIB. This may be repeated for each adjacency included in the routing policy until the target node is reached.

By way of illustration, using FIB 802 as an example, deriving module 108 may select source node (0,0) and target node (0,10) from routing policy 708. Deriving module 108 may then, using adjacency matrix 602 (i.e., adj[0][0][0]), determine that (0,0) is adjacent to (0,0), (0,1), and (0,2). Deriving module 108 may then include nodes (0,0), (0,1), and (0,2) as next hops from (0,0) within FIB 802. Deriving module 108 may then, using adjacency matrix 606 (i.e., adj[0][1]), determine that (0,0) is adjacent to (1,0) and (1,6), and may add those nodes as potential next hops from (0,0). Deriving module 108 may further determine, using adjacency matrix 606, that (0,1) is adjacent to (1,1) and (1,7), and may add those nodes as potential next hops from (0,1). Deriving module 108 may also determine, using adjacency matrix 606, that (0,2) is adjacent to (1,2) and (1,8), and may add those nodes as potential next hops from (0,2). This process may continue, with deriving module 108 successively using adjacency matrix 608 (i.e., adj[1][0]), adjacency matrix 604 (i.e., adj[0][0][1]), and adjacency matrix 602 (i.e., adj[0][0][0]), until deriving module 108 derives an FIB similar to FIB 802.

Additionally, deriving module 108 may derive an FIB for a networking device in a data center network by applying a variety of linear algebra and caching techniques to the adjacency matrices included in a routing policy (e.g., routing policy 210). For example, deriving module 108 may determine an additional set of networking devices in the data center network (e.g., data center network data 206) to which the networking device is capable of transmitting data. Deriving module 108 may represent connectivity of the networking device to the additional set of networking devices as a matrix (e.g., a multi-dimensional array, a vector, etc.), and execute a matrix operation (e.g., a matrix multiplication operation) using adjacency matrices included in the routing policy and the matrix representing connectivity of the networking device to the additional set of networking devices. From the resulting matrix, deriving module 108 may identify a path from the networking device to a target networking device in the data center network.

Figure 9B:
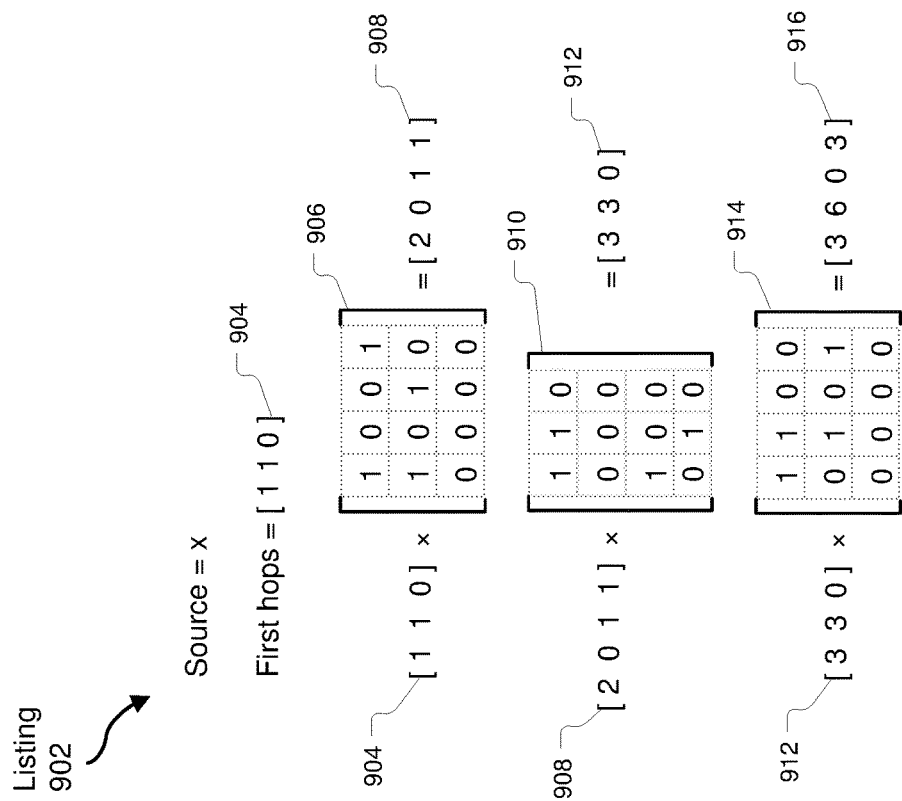
FIGS. 9A, 9B, and 10 illustrate various ways of deriving an FIB based on a defined topology of a data center network and a generated routing policy.
Figure 9A:
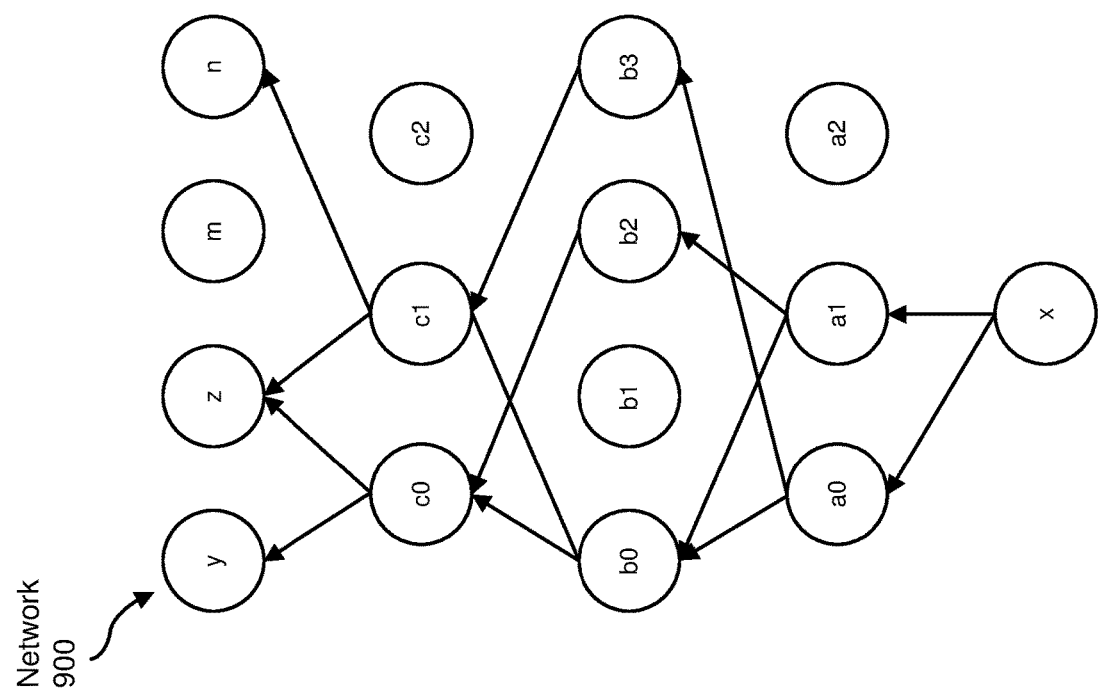

To illustrate, FIG. 9A shows an additional example network 900 ("network 900") that represents various paths that may connect source node x to target nodes y, z, m, and n. Nodes a0 through a3, nodes b0 through b3, and nodes c0 through c2 represent various intermediary nodes that may support connections between source node x and the target nodes.

Listing 902 shows a sequence of matrix operations that deriving module 108 may execute to matrix representations of connectivity between the nodes of network 900. For example, beginning at source node x, network 900 may route traffic to either node a0 or a1; node x is not connected to node a3. As shown in listing 902, matrix 904 may represent connectivity of node x to nodes a0 through a2 (i.e., [1 1 0]). Likewise, matrix 906 may represent connectivity between nodes a0 to a2 and nodes b0 to b3. For example, node a0 may be connected to node b0 and node b3, but not connected to nodes b1 or b2. The top row of matrix 906 may represent this connectivity (i.e., [1 0 0 1]). Node a1 may be connected to nodes b0 and b2, but not connected to nodes b1 or b3. The middle row of matrix 906 may represent this connectivity (i.e., [1 0 1 0]). Node a2 may not be connected to any of nodes b0 through b3. The bottom row of matrix 906 may represent this connectivity (i.e., [0 0 0 0]).

Deriving module 108 may execute a matrix multiplication operation using matrix 904 and matrix 906, which may result in matrix 908 (i.e., [2 0 1 1]). Matrix 908 may indicate that there are two paths to reach node b0 from source node x, zero paths to reach node b1 from source node x, one path to reach node b2 from source node x, and one path to reach node b3 from source node x.

As matrix 906 may represent connectivity between nodes a0 to a2 and nodes b0 to b3, so may matrix 910 represent connectivity between nodes b0 to b3 and nodes c0 to c2. For example, node b0 may be connected to nodes c0 and c1, but not to node c2. The top row of matrix 910 may represent this connectivity (e.g., [1 1 0]). Likewise, the second row of matrix 910 may represent connectivity of node b1 to nodes c0 to c2 (e.g., [0 0 0]), the third row of matrix 910 may represent connectivity of node b2 to nodes c0 to c2 (e.g., [1 0 0]), and the bottom row of matrix 910 may represent connectivity of node b3 to nodes c0 to c2 (e.g., [0 1 0]).

Deriving module 108 may execute a matrix multiplication operation using matrix 908 and matrix 910, which may result in matrix 912 (i.e., [3 3 0]). Matrix 912 may indicate that there are three paths to reach node c0 from source node x, three paths to reach node c1 from source node x, and zero paths to reach node c3 from source node x.

As matrix 910 may represent connectivity between nodes b0 to b3 and nodes c0 to c2, so may matrix 910 represent connectivity between nodes c0 to c2 and nodes y, z, m, and n. For example, node c0 may be connected to nodes y and z, but not to nodes m and n. The top row of matrix 914 may represent this connectivity (e.g., [1 1 0 0]). Likewise, the second row of matrix 914 may represent connectivity of node c1 to nodes y, z, m, and n (e.g., [0 1 0 1]), and the bottom row of matrix 914 may represent connectivity of node c2 to nodes y, z, m, and n (e.g., [0 0 0 0]).

Deriving module 108 may execute a matrix multiplication operation using matrix 908 and matrix 910, which may result in matrix 916 (i.e., [3 6 0 3]). Matrix 912 may indicate that there are three paths to reach node y from source node x, six paths to reach node z from source node x, zero paths to reach node m from source node x, and three paths to reach node n from source node x.

Figure 10:
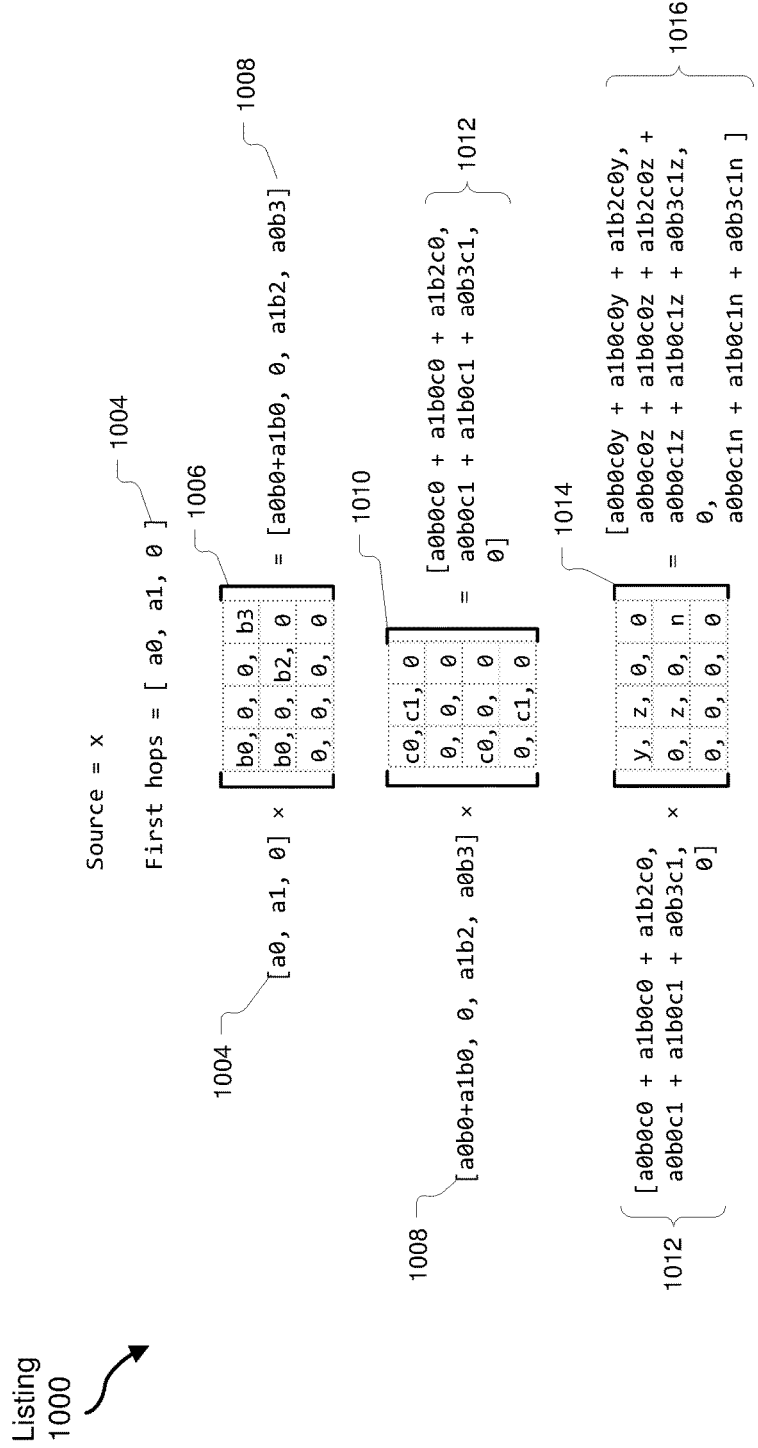

While these operations may indicate the number of paths from a source node to a destination node, they may not indicate the paths themselves. FIG. 10 includes listing 1000 that replaces the indications of connectivity within the matrices of FIG. 9 with identifiers that correspond to the specific nodes that are connected to each other.

As shown in listing 1000, matrix 1004 may represent connectivity of node x to nodes a0 through a2 (i.e., [a0, a1, 0]). Likewise, matrix 1006 may represent connectivity between nodes a0 to a2 and nodes b0 to b3. For example, node a0 may be connected to node b0 and node b3, but not connected to nodes b1 or b2. The top row of matrix 1006 may represent this connectivity (i.e., [b0, 0, 0, b3]). Node a1 may be connected to nodes b0 and b2, but not connected to nodes b1 or b3. The middle row of matrix 1006 may represent this connectivity (i.e., [b0, 0, b2, 0]). Node a2 may not be connected to any of nodes b0 through b3. The bottom row of matrix 1006 may represent this connectivity (i.e., [0, 0, 0, 0]).

Deriving module 108 may execute a matrix multiplication operation using matrix 1004 and matrix 1006, which may result in matrix 1008 (i.e., [a0b0+a1b0, 0, a1b2, a0b3]). The individual operands of the expressions within matrix 1008 may indicate paths to reach node b0 from source node x. For example, a0b0 may indicate that a path exists from source node x to a0, and from a0 to b0. Likewise, a1b0 may indicate that a path exists from source node x to a1, and from a1 to b0, matrix 1008 may further indicate that there are zero paths to reach node b1 from source node x, one path to reach node b2 from source node x (e.g., a1b2), and one path to reach node b3 from source node x (e.g., a0b3).

As matrix 1006 may represent connectivity between nodes a0 to a2 and nodes b0 to b3, so too may matrix 1010 represent connectivity between nodes b0 to b3 and nodes c0 to c2. For example, node b0 may be connected to nodes c0 and c1, but not to node c2. The top row of matrix 1010 may represent this connectivity (e.g., [c0, c1, 0]). Likewise, the second row of matrix 1010 may represent connectivity of node b1 to nodes c0 to c2 (e.g., [0, 0, 0]), the third row of matrix 1010 may represent connectivity of node b2 to nodes c0 to c2 (e.g., [c0, 0, 0]), and the bottom row of matrix 1010 may represent connectivity of node b3 to nodes c0 to c2 (e.g., [0, c1, 0]).

Deriving module 108 may execute a matrix multiplication operation using matrix 1008 and matrix 1010, which may result in matrix 1012. Matrix 1012 may indicate that there are three paths to reach node c0 from source node x (e.g., a0b0c0, a1b0c0, and a1b2c0), three paths to reach node c1 from source node x (e.g., a0b0c1+a1b0c1+a0b3c1), and zero paths to reach node c3 from source node x.

As matrix 1010 may represent connectivity between nodes b0 to b3 and nodes c0 to c2, so too may matrix 1010 represent connectivity between nodes c0 to c2 and nodes y, z, m, and n. For example, node c0 may be connected to nodes y and z, but not to nodes m and n. The top row of matrix 1014 may represent this connectivity (e.g., [y, z, 0, 0]). Likewise, the second row of matrix 1014 may represent connectivity of node c1 to nodes y, z, m, and n (e.g., [0, z, 0, n]), and the bottom row of matrix 1014 may represent connectivity of node c2 to nodes y, z, m, and n (e.g., [0, 0, 0, 0]).

Deriving module 108 may execute a matrix multiplication operation using matrix 1008 and matrix 1010, which may result in matrix 1016. As with matrix 1012, matrix 1016 may indicate three paths to reach node y from source node x (e.g., a0b0c0y, a1b0c0y, and a1b2c0y), six paths to reach node z from source node x (a0b0c0z, a1b0c0z, a1b2c0z, a0b0c1z, a1b0c1z, and a0b3c1z), zero paths to reach node m from source node x, and three paths to reach node n from source node x (e.g., a0b0c1n, a1b0c1n, and a0b3c1n).

Deriving module 108 may identify at least one of these paths from the source networking device (e.g., a networking device represented by node x) to a target networking device (e.g., a networking device represented by node y), and include the path from the source networking device to the target networking device in the FIB for the networking device. These operations may improve an efficiency and/or speed of derivation of an FIB for a networking device in a data center network.

Returning to FIG. 3, at step 340, one or more of the systems described herein may compile a data center traffic profile for the data center network based on the derived FIBs. The data center traffic profile may include a set of data flows, each data flow in the set of data flows including an amount of data that a source networking device begins to transfer to a destination networking device via the data center network at a predetermined time. For example, compiling module 110 may compile data center traffic profile 214 based on FIBs 212.

In some embodiments, a "data flow" may represent an amount of data (e.g., 100 MB, 1,000 MB, etc.) that a source networking device begins to transfer to a destination networking device via the data center network at a predetermined time. A data flow may be represented as a tuple in the format of (source, destination, size, start_time), where "source" denotes the source networking device, "destination" denotes the destination networking device, "size" represents the amount of data, and "start_time" represents the time that the source networking device begins to transfer the data to the destination networking device.

Compiling module 110 may compile data center traffic profile 214 in a variety of contexts. For example, compiling module 110 may define a set of data flows that may subject a data center network to a stimulus when executing module 112 executes a simulation of the data center network based on the compiled data center profile. Compiling module 110 may define each data flow in the set of data flows to have a source, destination, size, and/or start time that provides a known, desired, or anticipated stimulus to at least a portion of the data center network.

In some examples, compiling module 110 may compile data center traffic profile 214 based on information associated with a physical, real-world data center network. In such examples, compiling module 110 may determine a number, size, etc. of the data flows in the set of data flows that may model the physical, real-world data center network. Additionally, compiling module 110 may receive (e.g., from a user) parameters for a data center traffic profile (e.g., a number of data flows, a size and/or a range of sizes for the data flows, a set of networking devices in a data center network to subject to stimulus, etc.), and may compile data center traffic profile 214 in accordance with the received parameters. In some examples, compiling module 110 may randomly generate a set of data flows, and include the randomly generated set of data flows in data center traffic profile 214.

Returning to FIG. 3, at step 350, one or more of the systems described herein may execute a simulation of the data center network via the data center traffic profile. For example, executing module 112 may execute simulation 218 via data center traffic profile 214.

Executing module 112 may execute simulation 218 via data center traffic profile 214 in a variety of contexts. For example, executing module 112 may define an RTT of the data center network. In some embodiments, an "RTT" may be a period of time, the expiration of which may cause executing module 112 to perform one or more simulation operations, as will be described in greater detail below. Executing module 112 may define the RTT of the data center network in any suitable way. For example, executing module 112 may receive input representative of the RTT and define the RTT in accordance with the received input. In other examples, executing module 112 may define the RTT in accordance with an expected or anticipated RTT for the data center network. By way of illustration, executing module 112 may select an RTT of up to ten seconds, up to five seconds, up to one second, up to one half second, etc.

Executing module 112 may, for each data flow in the set of data flows, use the derived FIBs to determine a flow trajectory of each of the data flows from the data flow's source networking device to the data flow's destination networking device. For example, returning to FIG. 8, if a data flow has a source of node 0 in tier 0 of network 500 (i.e., (0,0)) and a destination of node 10 in tier 0 of network 500 (i.e., (0,10)), executing module 112 may use FIB 802 to determine a flow trajectory from (0,0) to (0,10). Executing module 112 may, in accordance with a load balancing function (e.g., ECMP) and based on FIB 802, determine a flow trajectory for the data flow of (0,0) to (1,0) to (0,6) to (0,9) to (0,10). Executing module 112 may then record the flow trajectory, such as within a suitable storage location included in memory 120. In some examples, executing module 112 may also determine an initial flow rate for each data flow included in the data center traffic profile. For example, executing module 112 may set an initial flow rate for a data flow at 20 Mb/s. Executing module 112 may also initiate at least one of the data flows included in the set of data flows.

Upon the expiration of the RTT, executing module 112 may update a link utilization of each networking device in the data center network, and execute at least one flow action for each data flow included in the data center traffic profile based on the link utilization of each networking device associated with the data flow. In some examples, executing module 112 may update the link utilization of each networking device in the data center network by determining, for each networking device, an amount of data transferred via the networking device during the RTT.

For example, suppose that two data flows, data flow A and data flow B, have flow trajectories that cause them to utilize a particular link L during an RTT of 3 seconds. Further suppose that data flow A has a flow rate during the RTT of 40 Mb/s, and data flow B has a flow rate during the RTT of 20 Mb/s. At the conclusion of the RTT, executing module 112 may update the link utilization of link L by determining that link L transferred 180 Mb during the RTT ((40 Mb/s+20 Mb/s)×3 s).

Upon each expiration of the RTT, executing module 112 may execute at least one flow action for each data flow included in the data center traffic profile based on the link utilization of each networking device associated with the data flow. A flow action may include at least one of (1) initiating the data flow, (2) increasing a flow rate of the data flow, (3) decreasing the flow rate of the data flow, (4) determining that the data flow is complete, (5) recording a completion time of the data flow, or (6) identifying a time out of the data flow.

Returning to the previous example, based on the determined link utilization of 180 Mb during the previous RTT, executing module 112 may determine that link L has exceeded a predetermined threshold capacity. Based on that determination, executing module 112 may decrease a flow rate of at least one of data flow A and data flow B for the duration of the next RTT. For example, executing module 112 may decrease the flow rate of data flow A to 20 Mb/s and/or may decrease the flow rate of data flow B to 10 Mb/s.

Conversely, based on the determined link utilization of 180 Mb during the previous RTT, executing module 112 may determine that link L has not reached the predetermined threshold capacity. Based on that determination, executing module 112 may increase a flow rate of at least one of data flow A and data flow B for the duration of the next RTT. For example, executing module 112 may increase a flow rate of data flow A to 80 Mb/s and/or may increase a flow rate of data flow B to 40 Mb/s.

When the simulation indicates that a data flow has transferred the data included in the data flow (e.g., 100 MB, 1,000 MB, etc.) from the data flow's source networking device to the data flow's destination networking device via the data flow's associated flow trajectory, executing module 112 may determine that the data flow is complete, and may record a completion time of the data flow. Additionally, a data flow may encounter an error condition and may time out. Executing module 112 may detect that the data flow has timed out, and may, in some examples, remove it from the simulation. The simulation may continue until all data flows in the data center traffic profile are complete or have timed out.

Figure 11:
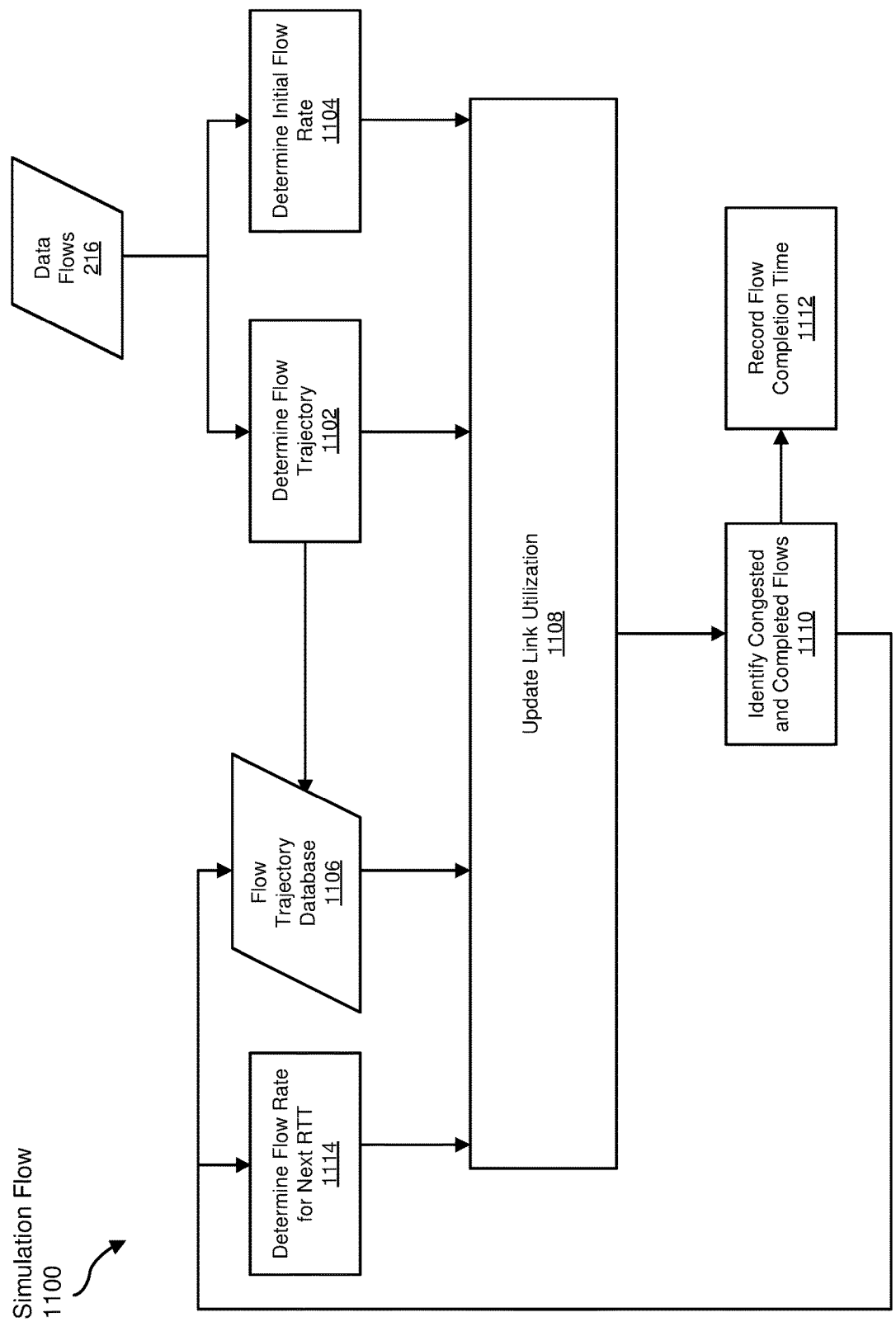
FIG. 11 is a flow diagram that illustrates executing a simulation of a data center network via a data center traffic profile.

FIG. 11 illustrates an example simulation flow 1100 for a simulation of a data center network via data center traffic profile 214. At the start time associated with each data flow in data flows 216, the data flow initially goes to step 1102 and step 1104, where executing module 112 determines the flow trajectory for the data flow and determines an initial flow rate for the data flow, respectively. After executing module 112 determines a flow trajectory for the data flow, executing module 112 records the determined flow trajectory in flow trajectory database 1106. At step 1108, upon each expiration of the RTT, executing module 112 updates the link utilization of each networking device in the data center network based on the recorded flow trajectories in flow trajectory database 1106. At step 1110, executing module 112 identifies congested and completed data flows. At step 1112, executing module 112 records the flow completion times of completed data flows. At step 1114, executing module 112 determines flow rates for the remaining data flows for the next RTT. The simulation may continue until all data flows 216 are complete, or have timed out.

In some embodiments, one or more of the systems described herein may determine a cost metric associated with the defined topology of the data center network based on the simulation of the data center network. For example, determining module 114 may determine cost metric 220 associated with topology 204 based on simulation 218.

In some examples, a "cost metric" may be any measurable attribute that may indicate a cost associated with an executed simulation of a defined topology of a data center network. In at least one example, a cost metric may be a duration of time between an initiation of a data flow (e.g., a data flow included in the data center traffic profile) and a completion of the data flow. In some examples, a cost metric may include a duration of time between an initiation of the simulation of the data center network and a completion of the simulation, a utilization of a particular networking device in the data center network during the simulation, a most-utilized networking device in the data center network during the simulation, or a distribution of utilization of the networking devices during the simulation.

Determining module 114 may determine cost metric 220 associated with topology 204 in any suitable way. For example, as described above, executing module 112 may record a completion time for each data flow included in a data center traffic profile. Determining module 114 may determine cost metric 220 by calculating a difference between a recorded completion time associated with a data flow completed during a simulation of a data center network and a predetermined, anticipated, expected, or predicted completion time. Additionally, determining module 114 may determine cost metric 220 by calculating an aggregate value representative of a set of recorded completion times associated with a set of data flows completed during a simulation of a data center network, and comparing the aggregate value against a predetermined, anticipated, expected, or predicted aggregate value.

As another example, determining module 114 may determine cost metric 220 associated with topology 204 by comparing a start time of a simulation of a data center network to a completion time of the simulation of the data center network. Determining module 114 may then designate the difference between the completion time and the start time as cost metric 220. As another example, one or more of modules 102 (e.g., executing module 112, determining module 114, etc.) may track the usage of each networking device during a simulation. Determining module 114 may identify a most-utilized networking device in the data center network during the simulation based on the tracked usage, and designate the identified networking device as cost metric 220. As a further example, determining module 114 may analyze the tracked usage and generate a distribution of utilization of the networking devices during the simulation. Determining module 114 may then designate the generated distribution as cost metric 220.

In some embodiments, one or more of the systems described herein may adjust the defined topology of the data center network based on the determined cost metric associated with the defined topology of the data center network. For example, adjusting module 116 may adjust topology 204 based on cost metric 220 associated with topology 204. Adjusting module 116 may adjust topology 204 based on cost metric 220 in any suitable way. By way of illustration, determining module 114 may determine a cost metric of +0.01 milliseconds between a recorded completion time of a data flow and an expected completion time of the data flow. Based on the determined cost metric, adjusting module 116 may adjust a routing policy associated with topology 204 (e.g., routing policy 210) such that adjusting module 116 anticipates that the adjusted routing policy may reduce the cost metric by a predetermined amount. As another example, adjusting module 116 may utilize any suitable machine learning and/or artificial intelligence method and/or system to adjust topology 204 so as to minimize cost metric 220.

Figure 12:
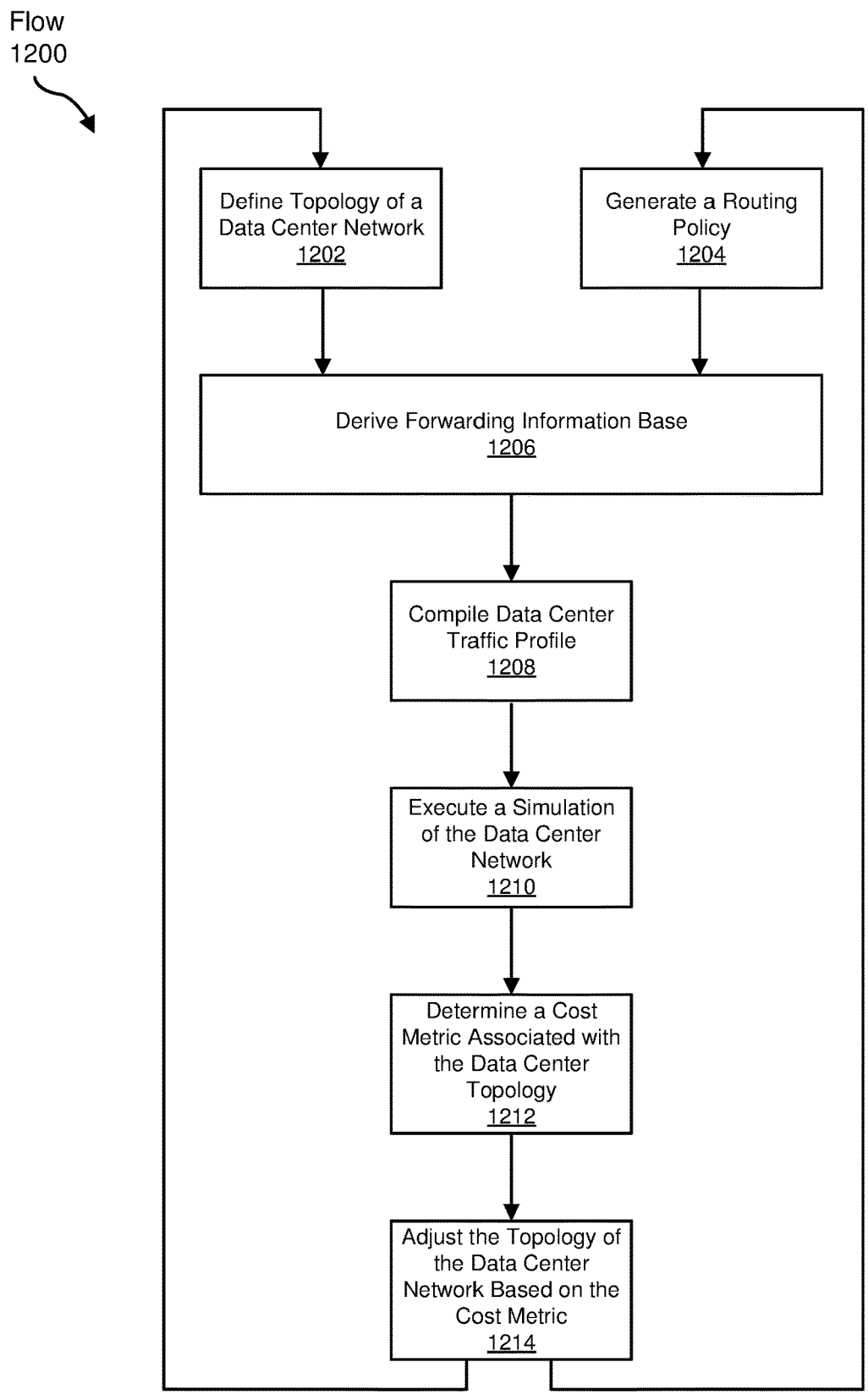
FIG. 12 is a flow diagram that illustrates adjusting a defined network topology based on a cost metric determined based on a simulation of a data center network.

FIG. 12 shows an operational flow ("flow 1200") that illustrates how the systems and methods described herein may provide a feedback mechanism that allows for iterative improvement of a data center topology (e.g., topology 204).

At step 1202, a system (e.g., one or more of systems 100 and/or 200 described herein) may define a topology of a data center network. Step 1202 may be accomplished in any of the ways described herein. At step 1204, the system may generate a routing policy for the data center network. Step 1204 may be accomplished in any of the ways described herein.

At step 1206, the system may derive an FIB for each networking device included in the data center network. Step 1206 may be performed in any of the ways described herein. At step 1208, the system may compile a data center traffic profile. Step 1208 may be performed in any of the ways described herein. At step 1210, the system may execute a simulation of the data center network. Step 1210 may be performed in any of the ways described herein.

At step 1212, the system may determine a cost metric associated with the data center topology. Step 1212 may be performed in any of the ways described herein. At step 1214, the system may adjust the topology of the data center network based on the cost metric. The flow then returns to step 1202 and step 1204. Operational flow 1200 may continue until the cost metric reaches a predetermined value, such as a predetermined maximum value, a predetermined minimum value, a predetermined percentage improvement, etc.

As discussed throughout the instant disclosure, the disclosed systems and methods may provide one or more advantages over traditional systems and methods for simulating data center network topologies. For example, unlike traditional network simulation methodologies that may not scale to the extent necessary to simulate complex and vast data center networks, the systems and methods described herein may scale to, and provide useful analytical data regarding, any size of data center network. By simulating a data center network topology in terms of data flows within the data center network rather than at the packet-level, a simulation of a data center topology according to the systems and methods described herein may be very efficient, and may therefore allow for simulation of more use cases, topologies, routing policies, and so forth. Additionally, the speed and efficiency with which the systems and methods described herein may determine cost metrics associated with data center network topologies may facilitate use of the determined cost metrics within an evaluative feedback loop that may aid in optimizing a data center network topology. Such an evaluative feedback loop may be utilized as part of a suitable machine learning and/or artificial intelligence method and/or system that may adjust (e.g., dynamically adjust) a network topology to minimize one or more cost metrics associated with the network topology.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive data representative of a data center network topology to be transformed, transform the data representative of the data center network topology to generate a routing policy for the data center network, output a result of the transformation to simulate the data center network, use the result of the transformation to determine a cost metric associated with the topology of the data center network, and store the result of the transformation to adjust the topology of the data center network based on the determined cost metric associated with the defined topology of the data center network. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    defining a topology of a data center network that defines an arrangement of a plurality of networking devices included in the data center network by:
        designating a set of networking devices within the data center network that share a common role within the data center network as a tier of the data center network; and
        generating a connection profile comprising at least one adjacency matrix that indicates that a first networking device is adjacent to a second networking device when the first networking device is capable of communicating with the second networking device;
    generating a routing policy for the data center network based on the defined topology of the data center network that describes how the plurality of networking devices route data within the data center network;
    for each networking device included in the data center network, deriving a forwarding information base (FIB) for the networking device based on the defined topology of the data center network and the generated routing policy for the data center network;
    compiling a data center traffic profile for the data center network based on the derived FIBs, the data center traffic profile comprising a set of data flows, each data flow in the set of data flows comprising an amount of data that a source networking device begins to transfer to a destination networking device via the data center network at a predetermined time; and
    executing a simulation of the data center network via the data center traffic profile.

2. The method of claim 1, wherein the routing policy comprises a sequence of connection profiles that the networking devices included in the data center network utilize to route data from the source networking device to the destination networking device.

3. The method of claim 2, wherein the routing policy further comprises a route target that defines a set of target networking devices that are meant to be reachable from the source networking device via the routing policy.

4. The method of claim 1, wherein defining the topology of
    the data center network further comprises
    assigning an identifier to each of the networking devices included in the tier of the data center network, the identifier associated with the tier of the data center network.

5. The method of claim 1, wherein deriving the FIB for the networking device comprises:
    determining an additional set of networking devices in the data center network to which the networking device is capable of transmitting data;
    representing connectivity of the networking device to the additional set of networking devices as a matrix;
    executing a matrix operation using the at least one adjacency matrix and the matrix representing connectivity of the networking device to the additional set of networking devices;
    identifying, based on executing the matrix operation, a path from the networking device to a target networking device in the data center network; and
    including the path from the networking device to the target networking device in the FIB for the networking device.

6. The method of claim 1, wherein the derived FIB for the networking device comprises at least one set of assigned identifiers that defines a data path from the networking device to another networking device in the data center network.

7. The method of claim 1, wherein executing the simulation of the data center network comprises:
defining a round-trip delay time (RTT) of the data center network;
initiating at least one data flow included in the set of data flows;
upon each expiration of the RTT:
updating a link utilization of each networking device in the data center network; and
executing at least one flow action for each data flow included in the data center traffic profile based on the link utilization of each networking device associated with the data flow.

8. The method of claim 7, wherein executing the simulation of the data center network further comprises, for each data flow in the set of data flows:
using the derived FIBs to determine a flow trajectory of the data flow from the source networking device to the destination networking device; and
recording the determined flow trajectory.

9. The method of claim 8, wherein updating the link utilization of each networking device in the data center network is based on the recorded flow trajectory of each data flow included in the set of data flows.

10. The method of claim 7, wherein updating the link utilization of each networking device in the data center network comprises determining, for each networking device, an amount of data transferred via the networking device during the RTT.

11. The method of claim 7, wherein the flow action comprises at least one of:
initiating the data flow;
increasing a flow rate of the data flow;
decreasing the flow rate of the data flow;
determining that the data flow is complete;
recording a completion time of the data flow; or
identifying a time out of the data flow.

12. The method of claim 1, further comprising:
determining a cost metric associated with the defined topology of the data center network based on the simulation of the data center network; and
adjusting the defined topology of the data center network based on the determined cost metric associated with the defined topology of the data center network.

13. The method of claim 12, wherein the cost metric associated with the defined topology of the data center network comprises at least one of:
a duration of time between an initiation of a data flow included in the data center traffic profile and a completion of the data flow;
a duration of time between an initiation of the simulation of the data center network and a completion of the simulation;
a most-utilized networking device in the data center network during the simulation; or
a distribution of utilization of the networking devices during the simulation.

14. A system comprising:
a defining module, stored in memory, that defines a topology of a data center network that defines an arrangement of a plurality of networking devices included in the data center network by:
designating a set of networking devices within the data center network that share a common role within the data center network as a tier of the data center network; and
generating a connection profile comprising at least one adjacency matrix that indicates that a first networking device is adjacent to a second networking device when the first networking device is capable of communicating with the second networking device;
a generating module, stored in memory, that generates a routing policy for the data center network based on the defined topology of the data center network that describes how the plurality of networking devices route data within the data center network;
a deriving module, stored in memory, that, for each networking device included in the data center network, derives a forwarding information base (FIB) for the networking device based on the defined topology of the data center network and the generated routing policy for the data center network;
a compiling module, stored in memory, that compiles a data center traffic profile for the data center network based on the derived FIBs, the data center traffic profile comprising a set of data flows, each data flow in the set of data flows comprising an amount of data that a source networking device begins to transfer to a destination networking device via the data center network at a predetermined time;
an executing module, stored in memory, that executes a simulation of the data center network via the data center traffic profile; and
at least one physical processor that executes the defining module, the generating module, the deriving module, the compiling module, and the executing module.

15. The system of claim 14, wherein the defining module further defines the topology of the data center network by
assigning an identifier to each of the networking devices included in the tier of the data center network, the identifier associated with the tier of the data center network.

16. The system of claim 15, wherein
the deriving module further derives the FIB for the networking device by:
determining an additional set of networking devices in the data center network to which the networking device is capable of transmitting data;
representing connectivity of the networking device to the additional set of networking devices as a matrix;
executing a matrix operation using the at least one adjacency matrix and the matrix representing connectivity of the networking device to the additional set of networking devices;
identifying, based on executing the matrix operation, a path from the networking device to a target networking device in the data center network; and
including the path from the networking device to the target networking device in the FIB for the networking device.

17. The system of claim 14, wherein the executing module executes the simulation of the data center network by:
defining a round-trip delay time (RTT) of the data center network;
initiating at least one data flow included in the set of data flows;
upon each expiration of the RTT:
updating a link utilization of each networking device in the data center network; and executing at least one flow action for each data flow included in the data center traffic profile based on the link utilization of each networking device associated with the data flow.

18. The system of claim 14, further comprising:
a determining module, stored in memory, that determines a cost metric associated with the defined topology of the data center network based on the simulation of the data center network; and
an adjusting module, stored in memory, that adjusts the defined topology of the data center network based on the determined cost metric associated with the defined topology of the data center network;
wherein the at least one physical processor further executes the determining module and the adjusting module.

19. A non-transitory computer-readable medium comprising instructions that, when executed by at least one processor of a computing system, cause the computing system to:
define a topology of a data center network that defines an arrangement of a plurality of networking devices included in the data center network by:
designating a set of networking devices within the data center network that share a common role within the data center network as a tier of the data center network; and
generating a connection profile comprising at least one adjacency matrix that indicates that a first networking device is adjacent to a second networking device when the first networking device is capable of communicating with the second networking device;
generate a routing policy for the data center network based on the defined topology of the data center network that describes how the plurality of networking devices route data within the data center network;
for each networking device included in the data center network, derive a forwarding information base (FIB) for the networking device based on the defined topology of the data center network and the generated routing policy for the data center network;
compile a data center traffic profile for the data center network based on the derived FIBs, the data center traffic profile comprising a set of data flows, each data flow in the set of data flows comprising an amount of data that a source networking device begins to transfer to a destination networking device via the data center network at a predetermined time; and
execute a simulation of the data center network via the data center traffic profile.

20. The system of claim 17, wherein the executing module further executes the simulation of the data center network by, for each data flow in the set of data flows:
using the derived FIBs to determine a flow trajectory of the data flow from the source networking device to the destination networking device; and
recording the determined flow trajectory.

* * * * *